United States Patent
Bayley et al.

(10) Patent No.: US 8,900,787 B2
(45) Date of Patent: Dec. 2, 2014

(54) TONER COMPOSITIONS

(71) Applicant: Xerox Corporation, Norwalk, CT (US)

(72) Inventors: Robert D. Bayley, Fairport, NY (US);
Grazyna E. Kmiecik-Lawrynowicz, Fairport, NY (US); Maura A. Sweeney, Irondequoit, NY (US); Susan J. LaFica, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 13/896,245

(22) Filed: May 16, 2013

(65) Prior Publication Data

US 2013/0252162 A1   Sep. 26, 2013

Related U.S. Application Data

(63) Continuation-in-part of application No. 12/575,736, filed on Oct. 8, 2009, now abandoned.

(51) Int. Cl.
| | |
|---|---|
| *G03G 9/087* | (2006.01) |
| *C08J 3/02* | (2006.01) |
| *G03G 9/08* | (2006.01) |
| *G03G 9/093* | (2006.01) |
| *C08K 5/098* | (2006.01) |
| *G03G 9/097* | (2006.01) |
| *C09D 125/14* | (2006.01) |

(52) U.S. Cl.
CPC . *G03G 9/093* (2013.01); *C08J 3/02* (2013.01); *G03G 9/087* (2013.01); *G03G 9/0804* (2013.01); *C08K 5/098* (2013.01); *G03G 9/097* (2013.01); *C09D 125/14* (2013.01); *G03G 9/08* (2013.01)
USPC .................................................. 430/137.15

(58) Field of Classification Search
CPC ............ G03G 9/0806; G03G 9/08711; G03G 9/08793
USPC ....................................................... 430/137.15
See application file for complete search history.

(56) References Cited

U.S. PATENT DOCUMENTS

| | | |
|---|---|---|
| 2,874,063 A | 3/1953 | Greig |
| 3,590,000 A | 6/1971 | Palermiti et al. |

(Continued)

FOREIGN PATENT DOCUMENTS

| | | |
|---|---|---|
| EP | 1 236 755 A2 | 9/2002 |
| EP | 1 383 011 A1 | 1/2004 |

(Continued)

OTHER PUBLICATIONS

Machine English language translation of JP 2004226448, Aug. 2004.*

(Continued)

*Primary Examiner* — Hoa V Le
(74) *Attorney, Agent, or Firm* — Pillsbury Winthrop Shaw Pittman LLP

(57) ABSTRACT

A process includes forming particles in a latex by emulsion polymerization of a mixture including one or more monomers in an emulsion, and about 4 percent or less by weight of the mixture of a non-surfactant-based charge control agent, the non-surfactant-based charge control agent is distributed within a matrix of the particles, and forming toner particles from the particles in the latex, the toner particles supporting a sufficient triboelectric charge for use under A-zone environmental conditions in a single-component development system.

17 Claims, 1 Drawing Sheet

(56) References Cited

U.S. PATENT DOCUMENTS

| | | | |
|---|---|---|---|
| 3,655,374 | A | 4/1972 | Palermiti et al. |
| 3,720,617 | A | 3/1973 | Chatterji et al. |
| 3,983,045 | A | 9/1976 | Jugle et al. |
| 4,265,990 | A | 5/1981 | Stolka et al. |
| 4,299,903 | A | 11/1981 | AuClair et al. |
| 4,563,408 | A | 1/1986 | Lin et al. |
| 4,584,253 | A | 4/1986 | Lin et al. |
| 4,935,326 | A | 6/1990 | Creatura et al. |
| 4,937,166 | A | 6/1990 | Creatura et al. |
| 4,950,575 | A | 8/1990 | Shiozaki et al. |
| 5,223,368 | A | 6/1993 | Ciccarelli et al. |
| 5,227,460 | A | 7/1993 | Mahabadi et al. |
| 5,324,613 | A | 6/1994 | Ciccarelli et al. |
| 5,346,797 | A | 9/1994 | Kmiecik-Lawrynowicz et al. |
| 5,364,729 | A | 11/1994 | Kmiecik-Lawrynowicz et al. |
| 5,403,693 | A | 4/1995 | Patel et al. |
| 5,418,108 | A | 5/1995 | Kmiecik-Lawrynowicz et al. |
| 5,501,935 | A | 3/1996 | Patel et al. |
| 5,527,658 | A | 6/1996 | Hopper et al. |
| 5,585,215 | A | 12/1996 | Ong et al. |
| 5,650,255 | A | 7/1997 | Ng et al. |
| 5,650,256 | A | 7/1997 | Veregin et al. |
| 5,853,943 | A | 12/1998 | Cheng et al. |
| 6,004,714 | A | 12/1999 | Ciccarelli et al. |
| 6,083,655 | A * | 7/2000 | Itabashi et al. .............. 430/122.2 |
| 6,165,668 | A | 12/2000 | Wilson et al. |
| 6,187,495 | B1 * | 2/2001 | Chiba et al. .............. 430/108.23 |
| 6,190,815 | B1 | 2/2001 | Ciccarelli et al. |
| 6,221,550 | B1 | 4/2001 | Wilson et al. |
| 6,652,634 | B1 | 11/2003 | Akers, Jr. et al. |
| 7,435,521 | B2 | 10/2008 | Vagi et al. |
| 7,781,135 | B2 | 8/2010 | Asarese et al. |
| 2003/0191263 | A1 | 10/2003 | Yoshida et al. |
| 2004/0002014 | A1 | 1/2004 | Chae et al. |
| 2004/0248025 | A1 | 12/2004 | Miyakawa |
| 2007/0281232 | A1 | 12/2007 | Yoshimura |
| 2009/0130582 | A1 | 5/2009 | Handa et al. |
| 2009/0136863 | A1 | 5/2009 | Asarese et al. |
| 2009/0202931 | A1 | 8/2009 | Lincoln et al. |

FOREIGN PATENT DOCUMENTS

| | | | |
|---|---|---|---|
| EP | 1 426 830 A1 | 6/2004 | |
| JP | 2004226448 | * 8/2004 | ............... G03G 9/08 |
| JP | 2005283725 | * 10/2005 | |

OTHER PUBLICATIONS

Machine English language translaion of JP 2005283725, Oct. 2005.*

Canadian Patent Office Communication dated Jan. 16, 2013, for Canadian Patent Application No. 2716666 (2 pages).

* cited by examiner

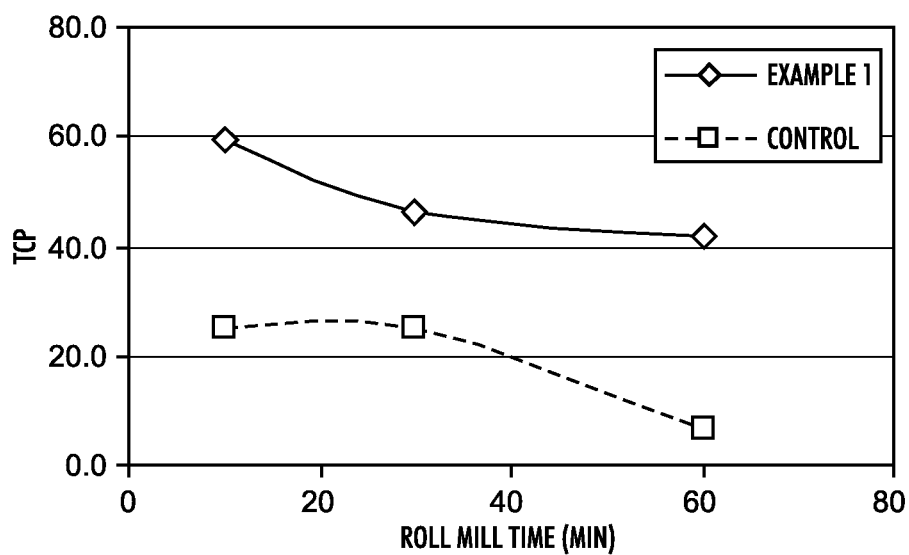

TONER COMPOSITIONS

STATEMENT OF RELATED APPLICATIONS

This application is a continuation-in-part of U.S. application Ser. No. 12/575,736 filed Oct. 8, 2009, the entire contents of which are incorporated herein by reference in its entirety.

BACKGROUND

Embodiments disclosed herein relate to conductive toner compositions and processes for making the same. More particularly, embodiments disclosed herein relate to toner particles employed in single-component development systems, which toner particles exhibit good performance under high temperature/high humidity conditions.

Single-component development (SCD) systems used in image forming devices often employ toner particles capable of supporting a triboelectric charge. Charging requirements for toner particles to operate in a SCD systems tend to be more demanding than for two-component development (TCD) toner particle/carrier systems. High charging toner particles that can perform well under high temperature/high humidity conditions to establish consistent machine performance in all environments is a continuing challenge in SCD systems.

SUMMARY

In some aspects, embodiments disclosed herein provide a process comprising forming particles in a latex by emulsion polymerization of a mixture comprising one or more monomers in an emulsion, and about 4 percent or less by weight of the mixture of a non-surfactant-based charge control agent, wherein the non-surfactant-based charge control agent is distributed within a matrix of the particles, and forming toner particles from the particles in the latex, the toner particles supporting a sufficient triboelectric charge for use under A-zone environmental conditions in a single-component development system.

In other aspects, embodiments disclosed herein provide a process comprising polymerizing by emulsion polymerization a mixture comprising one or more monomers in an emulsion, about 1 percent or less by weight of the mixture of a negatively charged charge control agent, wherein the polymerizing step provides a latex with the non-surfactant-based charge control agent distributed within a matrix of the latex, and forming by emulsion aggregation/coalescence a plurality of toner particles, wherein the plurality of toner particles support a sufficient triboelectric charge for use under A-zone environmental conditions in a single-component development system.

In still other aspects, embodiments disclosed herein provide a toner particle comprising a core-shell configuration, the particle comprising a copolymer resin, less than about 4 percent by weight of the toner particle of zinc salicylate disposed within a matrix of the copolymer resin, a wax, and an optional colorant, wherein the toner particle supports a triboelectric charge in a range from about from about −50 microcoulombs/gram to −70 microcoulombs/gram under A-zone environmental conditions in a single-component development system.

BRIEF DESCRIPTION OF THE DRAWINGS

Various embodiments of the present disclosure will be described herein below with reference to the FIGURE wherein:

FIG. 1 is a graph depicting the triboelectric charge of a toner possessing a charge control agent prepared in accordance with the present disclosure compared with a control toner that did not possess the charge control agent.

DETAILED DESCRIPTION

Initial toners evaluated in SCD systems exhibited poor development under high temperature/high humidity environmental conditions. To overcome this deficiency, it was discovered that primary latex toner particles doped with about 4% charge control agent (CCA) in a shell disposed about the particles improved triboelectric charge under high temperature/high humidity conditions. However reproducibility of the CCA-doped latex manufacture process and scale-up were plagued by reactor fouling during emulsion polymerization to form the CCA-doped latex.

As disclosed herein, embodiments provide processes that are amenable to scale up, are reproducible, and ameliorate issues of reactor fouling. In particular, it has been discovered that the use of non-surfactant-based charge control agents coupled with low loadings, i.e. less than about 4 percent by weight, improve scale-up and reproducibility while reducing reactor fouling. Low loading non-surfactant-based CCA also provides a toner product that maintains good performance under high temperature/high humidity conditions. In embodiments, non-surfactant-based charge control agents having low hydrophilicity may impart particularly favorable characteristics to the toner particles under stressful environmental conditions. Low hydrophilicity may be achieved, for example, by incorporating hydrophobic moieties into the CCA structure.

Processes disclosed herein for preparing CCA-doped latexes may employ low concentrations of CCA, in particular embodiments, less than about 4 percent by weight of the latex, or less than about 3, or less than about 2, or less than about 1 percent by weight of the latex. The lower CCA concentration in the latex substantially reduces reactor fouling which can be problematic at higher CCA concentrations, even where the higher concentration is at about 4 percent. In some embodiments, reactor fouling may also be a function of scale. For example, in some embodiments, where scale is sufficiently small, such as about 10 liters more than about 3 percent by weight of CCA may be used, such as about 3.5, 3.6, 3.7, 3.8, 3.9, and even about 4.0 percent by weight of the latex. In embodiments, processes disclosed herein may be practiced across a range of CCA concentrations from as low as about 0.3 percent by weight of the latex, to about 4 percent by weight of the latex, with the understanding that as a reaction is scaled up, it may be beneficial to operate at reduced loadings. Thus, in embodiments, at particularly large scale production levels, such as about 1,000 liters the amount of CCA employed in processes disclosed herein may be less than about 1 percent by weight. As an added benefit, when employing these lower concentrations of CCA in the latex there may also be provided superior distribution of CCA on the toner surface with smaller domains of CCA potentially providing more uniform charging. Embodiments providing superior distribution and more uniform charging of toner particles may be realized by low CCA content latex in the shell, core, or both for toner particles having a shell-core configuration.

In some embodiments, there are provided processes comprising forming particles in a latex by emulsion polymerization of a mixture comprising one or more monomers in an emulsion and about 1 percent or less by weight of the mixture of a non-surfactant-based charge control agent, wherein the non-surfactant-based charge control agent is distributed within a matrix of the particles, and the processes further comprising forming toner particles from the particles in the latex, the toner particles supporting a sufficient triboelectric charge for use under A-zone environmental conditions in a single-component development system.

As used herein, "emulsion polymerization" generally refers to a radical polymerization that is carried out in an emulsion incorporating water, monomers, and usually a surfactant.

As used herein, "latex" generally refers to a liquid having polymeric resin particles dispersed therein. Latexes may be prepared directly from emulsion polymerization reactions.

As used herein, "non-surfactant-based charge control agent" refers to any charge control agent that would not be classified as a surfactant. Surfactant-based CCAs include, without limitation, quaternary ammonium surfactants, such as stearyl dimethyl benzyl ammonium para-toluene sulfonate, stearyl dimethyl phenethyl ammonium para-toluene sulfonate, cetyl pyridinium chloride, distearyl dimethyl ammonium methyl sulfate, benzyldimethyloctadecylammonium chloride, DDABS and the like. Non-surfactant-based charge control agents include metal salicylates, such as 3,5-di-tert-butylsalicylic acid calcium salt, 3,5-di-tert-butylsalicylic acid zirconium salt, 3,5-di-tert-butylsalicylic acid zinc salt, 3,5-di-tert-butylsalicylic acid aluminum salt, 3,5-di-tert-butylsalicylic acid iron salt, 3,5-di-tert-butylsalicylic acid chromium salt and the like. In some embodiments, the charge control agents employed in processes disclosed herein may be surfactant-based, with the proviso that the surfactants exhibit a sufficiently low hydrophilicity. In some embodiments, surfactant-based charge control agents may be used in combination with the requisite non-surfactant-based control agents. In some such embodiments, the bulk of the charge control agent is a non-surfactant-based control agents and a substantially smaller amount of surfactant-based charge control agent is used to modulate charge.

As used herein, "A-zone environmental conditions" refers to high temperature/high humidity conditions employed when screening charge performance efficacy of toner particles disclosed herein. A-zone (80% RH and 80° F.) includes high humidity, such as about 80% relative humidity at a temperature of about 27° C. Toner particles disclosed herein may perform well under such A-zone conditions. Similarly, the toner particles disclosed herein may also perform well under C-zone (20% RH and 60° F.) conditions, that is, low humidity such as about 20% relative humidity at a temperature of about 15° C.

As used herein, "single-component development system" refers to the use of toner particles in a toner composition that operate in the absence of carrier particles.

Processes disclosed herein may comprise forming by emulsion aggregation/coalescence a plurality of toner particles. That is, the primary particles in the latex derived by an emulsion polymerization may be formulated with conventional additives such as waxes, pigments, and subjected to aggregation with the aid of polyaluminum chloride. Such aggregation may be carried out with mixing and heating in a controlled manner to create aggregated particles with a well-defined narrow distribution of effective diameters. In some embodiments, the effective diameter may be in a range from about 2 to about 6 microns, or about 4 to about 6 microns, or about 5 microns. The aggregation may be performed with the 1% or less CCA-doped latex as described herein, or with a latex lacking CCA doping. Where the core toner particle latex lacks CCA-doping, processes disclosed herein include providing a shell latex doped with 1% or less CCA doping and coalescing the CCA-doped shell latex about the surface of the aggregated particles via heating.

Thus, processes disclosed herein may comprise forming a core of a toner particle from the latex doped with CCA. In other embodiments, processes disclosed herein may comprise forming a shell of a toner particle from the latex doped with CCA. In still further embodiments, processes disclosed herein may comprise forming a core and shell from the latex doped with CCA.

The resultant core-shell toner particle may have an effective diameter in a range of from about 3 microns to about 7 microns, or about 4 to about 6 microns, or about 5 microns. One skilled in the art will appreciate that the controlled emulsion aggregation/coalescence process allows the user to access toner particles larger or smaller than these recited ranges if so desired.

In embodiments, processes disclosed herein provide toner particles that support triboelectric charging sufficient for use not only under the demanding conditions of high humidity/high temperature of A-zone conditions, but also a sufficient charge for use under C-zone environmental conditions in a single-component development system. Thus, the toner particles disclosed herein can perform across the widest area of environmental conditions based on the A-zone and C-zone extremes.

In embodiments, the toner particle is negatively charged. In some such embodiments, a sufficient triboelectric charge for use under A-zone environmental conditions is in a range from about −20 microcoulombs/gram to about −100 microcoulombs/gram, or from about −40 microcoulombs/gram to about −80 microcoulombs/gram, or from about −50 microcoulombs/gram to about −70 microcoulombs/gram. Such ranges of charge may be achieved employing non-surfactant-based charge control agent such as metal salicylates. In particular embodiments, metal salicylate may comprise zinc or aluminum ions. In embodiments, the non-surfactant-based charge control agent may be hydrophobic. Exemplary non-surfactant-based charge control agents that are hydrophobic are further exemplified herein below. In some embodiments, surfactant-based charge control agents may be employed in processes disclosed herein, however, their performance may depend on having a sufficiently low hydrophilicity. It was discovered that for operation under A-zone conditions, non-surfactant-based charge control agents bearing hydrophobic moieties can ameliorate the negative effects of elevated humidity and temperature. Moreover, it was also discovered that in the processing of the latex containing CCA, avoidance of reactor fouling can be dramatically affected by employing the non-surfactant-based charge control agents at concentrations lower than or equal to about 1% by weight of the latex polymer. For example, it has been determined that at a weight % of CCA in the latex of about 1% or lower provides a clean latex emulsion at 2 gallon glass reactor scale. At the low end, the CCA may be as low as about 0.1%, or about 0.2%, or about 0.3% by weight of the latex polymer.

In some embodiments, there are provided processes comprising polymerizing by emulsion polymerization a mixture comprising one or more monomers in an emulsion and about 1 percent or less by weight of the mixture of a non-surfactant-based charge control agent, wherein the polymerizing step provides a latex with the non-surfactant-based charge control agent distributed within a matrix of the latex, and the method further comprising forming by emulsion aggregation/coalescence a plurality of toner particles, wherein the plurality of toner particles support a sufficient triboelectric charge for use under A-zone environmental conditions in a single-component development system. Such processes may be used to form a core of a core-shell toner particle.

In some such embodiments, processes also provide the plurality of toner particles are also capable of supporting a sufficient charge for use under C-zone environmental conditions in a single-component development system.

In some embodiments, there are provided toner particles comprising a core-shell configuration, comprising a copolymer resin, less than about 1 percent by weight of the copolymer resin of zinc salicylate disposed uniformly within the matrix of the copolymer resin, a wax, and an optional colorant, wherein the toner particle supports a triboelectric charge in a range from about −50 to about −70 microcoulombs/gram under A-zone environmental conditions in a single-component development system. In some such embodiments, toner particles include a copolymer resin comprising a styrene-acrylate. In particular embodiments, the zinc salicylate is present in an amount of about 0.9% by weight of the toner particle. The toner copolymer resin may incorporate zinc salicylate charge control agent in the core, shell, or both. In principle, toner particles having these characteristics may be accessible by other processes known to those skilled in the art, such as dispersion or suspension polymerization.

Toner particles disclosed herein may be characterized by having distributed CCA throughout the matrix of the copolymer resin at lower than conventional loadings providing improved toner triboelectric charging performance.

The present disclosure provides toners and processes for the preparation of toner particles having excellent charging characteristics. Toners of the present disclosure may be prepared with a latex in which charge control agents (CCA) were incorporated during the latex polymerization process. The latex with CCA may then be used by itself, or combined with a non-CCA containing latex, pigment and wax, to form toner particles.

In embodiments, toners of the present disclosure may be prepared by combining a latex polymer having a charge control agent incorporated therein during the latex polymerization process, an optional colorant, an optional wax, and other optional additives. While the latex polymer may be prepared by any method within the purview of those skilled in the art, in embodiments the latex polymer may be prepared by emulsion polymerization methods, including semi-continuous emulsion polymerization, and the toner may include emulsion aggregation toners. Emulsion aggregation involves aggregation of both submicron latex and pigment particles into toner size particles, where the growth in particle size is, for example, in embodiments from about 0.1 micron to about 15 microns.

Resin

Processes disclosed herein for the manufacture of CCA-doped toner particles may employ one or more monomers comprising a styrene, an acrylate, a methacrylate, a butadiene, an isoprene, an acrylic acid, a methacrylic acid, an acrylonitrile, and combinations thereof. Any monomer suitable for preparing a latex for use in a toner may be utilized. As noted above, in embodiments the toner may be produced by emulsion aggregation. Suitable monomers useful in forming a latex polymer emulsion, and thus the resulting latex particles in the latex emulsion, include, but are not limited to, styrenes, acrylates, methacrylates, butadienes, isoprenes, acrylic acids, methacrylic acids, acrylonitriles, combinations thereof, and the like.

In embodiments, the latex polymer may include at least one polymer. In embodiments, at least one may be from about one to about twenty and, in embodiments, from about three to about ten. Exemplary polymers include styrene acrylates, styrene butadienes, styrene methacrylates, and more specifically, poly(styrene-alkyl acrylate), poly(styrene-1,3-diene), poly(styrene-alkyl methacrylate), poly (styrene-alkyl acrylate-acrylic acid), poly(styrene-1,3-diene-acrylic acid), poly (styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly (styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly (butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly (methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly (styrene-butyl acrylate), poly (styrene-butadiene-acrylic acid), poly(styrene-butadiene-methacrylic acid), poly (styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylonitrile-acrylic acid), poly (styrene-butadiene), poly(styrene-isoprene), poly(styrene-butyl methacrylate), poly(styrene-butyl acrylate-acrylic acid), poly(styrene-butyl methacrylate-acrylic acid), poly (butyl methacrylate-butyl acrylate), poly(butyl methacrylate-acrylic acid), poly(acrylonitrile-butyl acrylate-acrylic acid), and combinations thereof. The polymers may be block, random, or alternating copolymers.

In addition, polyester resins which may be used include those obtained from the reaction products of bisphenol A and propylene oxide or propylene carbonate, as well as the polyesters obtained by reacting those reaction products with fumaric acid (as disclosed in U.S. Pat. No. 5,227,460, the entire disclosure of which is incorporated herein by reference), and branched polyester resins resulting from the reaction of dimethylterephthalate with 1,3-butanediol, 1,2-propanediol, and pentaerythritol.

In embodiments, a poly(styrene-butyl acrylate) may be utilized as the latex polymer. The glass transition temperature of this first latex, which in embodiments may be used to form a toner of the present disclosure, may be from about 35° C. to about 75° C., in embodiments from about 40° C. to about 70° C.

Surfactants

In embodiments, the latex may be prepared in an aqueous phase containing a surfactant or co-surfactant. Surfactants which may be utilized with the polymer to form a latex dispersion can be ionic or nonionic surfactants, or combinations thereof, in an amount of from about 0.01 to about 15 weight percent of the solids, and in embodiments of from about 0.1 to about 10 weight percent of the solids.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abietic acid available from Aldrich, NEOGEN R™, NEOGEN SC™ obtained from Daiichi Kogyo Seiyaku Co., Ltd., combinations thereof, and the like.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, C12, C15, C17 trimethyl ammonium bromides, combinations thereof, and the like. Other cationic surfactants include cetyl pyridinium bromide, halide salts of quaternized polyoxyethylalkylamines, dodecylbenzyl triethyl ammonium chloride, MIRAPOL and ALKAQUAT available from Alkaril Chemical Company, SANISOL (benzalkonium chloride), available from Kao Chemicals, combinations thereof, and the like. In embodiments a suitable cationic surfactant includes SANISOL B-50 available from Kao Corp., which is primarily a benzyl dimethyl alkonium chloride.

Examples of nonionic surfactants include, but are not limited to, alcohols, acids and ethers, for example, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, combinations thereof, and the like. In embodiments commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX890™ and ANTAROX 897™ can be utilized.

The choice of particular surfactants or combinations thereof, as well as the amounts of each to be used, are within the purview of those skilled in the art.

Initiators

In embodiments initiators may be added for formation of the latex polymer. Examples of suitable initiators include water soluble initiators, such as ammonium persulfate, sodium persulfate and potassium persulfate, and organic soluble initiators including organic peroxides and azo compounds including Vazo peroxides, such as VAZO64™, 2-methyl 2-2'-azobis propanenitrile, VAZO 88™, 2-2'-azobis isobutyramide dehydrate, and combinations thereof. Other water-soluble initiators which may be utilized include azoamidine compounds, for example 2,2'-azobis(2-methyl-N-phenylpropionamidine)dihydrochloride, 2,2'-azobis[N-(4-chlorophenyl)-2-methylpropionamidine]di-hydrochloride, 2,2'-azobis[N-(4-hydroxyphenyl)-2-methyl-propionamidine]dihydrochloride, 2,2'-azobis[N-(4-amino-phenyl)-2-methylpropionamidine]tetrahydrochloride, 2,2'-azobis[2-methyl-N(phenylmethyl)propionamidine]dihydrochloride, 2,2'-azobis[2-methyl-N-2-propenylpropionamidine]dihydrochloride, 2,2'-azobis[N-(2-hydroxyethyl)-2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane] dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis{2-[1-(2-hydroxyethyl)-2-imidazolin-2-yl]propane}dihydrochloride, combinations thereof, and the like.

Initiators can be added in suitable amounts, such as from about 0.1 to about 8 weight percent of the monomers, and in embodiments of from about 0.2 to about 5 weight percent of the monomers.

Chain Transfer Agents

In embodiments, chain transfer agents may also be utilized in forming the latex polymer. Suitable chain transfer agents include dodecane thiol, octane thiol, carbon tetrabromide, combinations thereof, and the like, in amounts from about 0.1 to about 10 percent and, in embodiments, from about 0.2 to about 5 percent by weight of monomers, to control the molecular weight properties of the latex polymer when emulsion polymerization is conducted in accordance with the present disclosure.

Functional Monomers

In embodiments, it may be advantageous to include a functional monomer when forming the latex polymer and the particles making up the polymer. Suitable functional monomers include monomers having carboxylic acid functionality. Such monomers may be of the following formula (I):

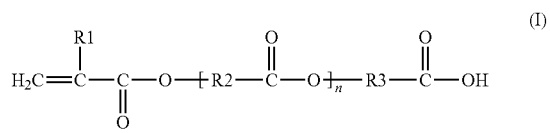

where R1 is hydrogen or a methyl group; R2 and R3 are independently selected from alkyl groups containing from about 1 to about 12 carbon atoms or a phenyl group; n is from about 0 to about 20, in embodiments from about 1 to about 10. Examples of such functional monomers include beta carboxyethyl acrylate (β-CEA), poly(2-carboxyethyl) acrylate, 2-carboxyethyl methacrylate, combinations thereof, and the like. Other functional monomers which may be utilized include, for example, acrylic acid, methacrylic acid and its derivatives, and combinations of the foregoing.

In embodiments, the functional monomer having carboxylic acid functionality may also contain a small amount of metallic ions, such as sodium, potassium and/or calcium, to achieve better emulsion polymerization results. The metallic ions may be present in an amount from about 0.001 to about 10 percent by weight of the functional monomer having carboxylic acid functionality, in embodiments from about 0.5 to about 5 percent by weight of the functional monomer having carboxylic acid functionality.

Where present, the functional monomer may be added in amounts from about 0.01 to about 10 percent by weight of the total monomers, in embodiments from about 0.05 to about 5 percent by weight of the total monomers, and in embodiments about 3 percent by weight of total monomers.

Charge Control Agents

As noted above, in embodiments a charge control agent (CCA) may be added to the latex containing the polymer. The use of a CCA may be useful for triboelectric charging properties of a toner, because it may impact the imaging speed and quality of the resulting toner. However, poor CCA incorporation with toner binder resins or surface blending may result in unstable triboelectric charging and other related issues for toner. This poor incorporation may also be a problem for toners produced during an EA particle formation process when a CCA is added. For example, in some cases, where about 0.5% by weight of a CCA is added during an EA particle formation process, the actual amount of CCA remaining in the toner may be as low as about 0.15% by weight.

In contrast, the processes of the present disclosure may provide improved incorporation of a CCA into a toner compared with adding the CCA during an EA process in particulate form, as is done for conventionally processed, i.e., non- EA, toners. In accordance with the present disclosure, CCAs incorporated into a latex may be formed and then utilized to incorporate CCAs into a toner composition. The use of such CCAs incorporated into a latex may provide toners with excellent charging characteristics, with reduced loss of CCA from the toner particle during EA particle formation.

Suitable charge control agents which may be utilized include, in embodiments, metal complexes of alkyl derivatives of acids such as salicylic acid, other acids such as dicarboxylic acid derivatives, benzoic acid, oxynaphthoic acid, sulfonic acids, other complexes such as polyhydroxyalkanoate quaternary phosphonium trihalozincate, metal complexes of dimethyl sulfoxide, combinations thereof, and the like. Metals utilized in forming such complexes include, but are not limited to, zinc, manganese, iron, calcium, zirconium, aluminum, chromium, combinations thereof, and the like. Alkyl groups which may be utilized in forming derivatives of salicylic acid include, but are not limited to, methyl, butyl, t-butyl, propyl, hexyl, combinations thereof and the like. Examples of such charge control agents include those commercially available as BONTRON® E-84 and BONTRON® E-88 (commercially available from Orient Chemical). BONTRON® E-84 is a zinc complex of 3,5-di-tert-butylsalicylic acid in powder form. BONTRON® E-88 is a mixture of hydroxyaluminium-bis[2-hydroxy-3,5-di-tert-butylbenzoate] and 3,5-di-tert-butylsalicylic acid. Other CCA's suitable for copolymerization with monomers are the calcium complex of 3,5-di-tert-butylsalicylic acid, a zirconium complex of 3,5-di-tert-butylsalicylic acid, and an aluminum complex of 3,5-di-tert-butylsalicylic acid, as disclosed in U.S. Pat. Nos. 5,223,368 and 5,324,613, the disclosures of each of which are incorporated by reference in their entirety, combinations thereof, and the like.

In embodiments, as noted above, a charge control agent may be in an aqueous dispersion or a CCA incorporated into a latex. In embodiments, the charge control agent may be dissolved into monomer(s) making up a latex emulsion to form a mixture, which may then be polymerized to incorporate the charge control agent into the copolymer. Polymerizing the mixture may occur by a process such as emulsion polymerization, suspension polymerization, dispersion polymerization, and combinations thereof.

In embodiments, a functional monomer may be utilized to form such a latex possessing a charge control agent. Suitable functional monomers, in embodiments, include those described above having carboxylic acid functionality. For example, in embodiments, a functional monomer having carboxylic acid functionality, such as acrylic acid, methacrylic acid, β-CEA, poly(2-carboxyethyl) acrylate, 2-carboxyethyl methacrylate, combinations thereof, and the like, may be combined with the charge control agent to form a CCA emulsion. Where present, a functional monomer may be present in an amount of from about 0.01 percent by weight to about 10 percent by weight of the monomers, in embodiments from about 0.5 percent by weight to about 4 percent by weight of the monomers used to form the latex. In embodiments, the charge control agent may thus be present in an amount of from about 0.01 percent by weight to about 10 percent by weight of the monomers, in embodiments from about 0.01 percent by weight to about 5 percent by weight of the monomers used to form the latex.

In embodiments, a CCA incorporated into a latex may also include a surfactant. Any surfactant described above may be utilized to form the latex. Where utilized, a surfactant may be present in an amount of from about 0.25 percent by weight to about 20 percent by weight of the latex, in embodiments from about 0.5 percent by weight to about 4 percent by weight of the latex.

Conditions for forming the CCA incorporated into a latex are within the purview of those skilled in the art. In embodiments, the CCA incorporated into a latex may be formed by combining the CCA, functional monomer, other monomers, chain transfer agents, and optional surfactant in a suitable container, such as a mixing vessel. The appropriate amount of CCA, stabilizer, surfactant(s), if any, and the like may be then combined in the reactor which contains an appropriate amount of water and surfactant, followed by an addition of an appropriate amount of initiator to commence the process of latex polymerization to produce latex particles containing the CCA.

Reaction conditions selected for forming the latex with incorporated CCA include temperatures of, for example, from about 30° C. to about 90° C., in embodiments from about 40° C. to about 75° C. Mixing may occur at a rate of from about 100 revolutions per minute (rpm) to about 450 rpm, in embodiments from about 150 rpm to about 300 rpm. The reaction may continue until the latex with incorporated CCA has formed, which may take from about 400 minutes to about 660 minutes, in other embodiments from about 500 minutes to about 600 minutes, or until monomer conversion is complete to obtain low acceptable residual volatiles.

The particle size of the CCA and/or CCA copolymer in the emulsion thus produced may be from about 15 nm to about 300 nm, in embodiments from about 20 nm to about to 50 nm, in embodiments from about 30 nm to about to 45 nm, in some embodiments about 37 nm, and in some embodiments about 215 nm. The particles thus produced are negatively charged and may be used alone as a charge control agent for a toner.

Contrary to methods which may utilize particulate CCAs, optionally in dispersions, and combine same with toner particles, the present disclosure forms a CCA which is incorporated in the polymer of a latex resin utilized to form a toner particle.

Thus, in accordance with the present disclosure, the latex possessing a CCA incorporated into the latex particle provides an alternative way to incorporate a CCA such as 3,5 Di-tert-butylsalicylic acid, zinc salt into a toner formed by an emulsion aggregation process.

For example, in embodiments, a resin utilized to form toner particles may include a first component derived from at least one metal complex of an alkyl derivative of an acid, at least a second component derived from a monomer utilized to form a resin, and optionally a component derived from at least one functional monomer possessing carboxylic acid functionality. For example, in embodiments, toner particles may be formed from a resin including a copolymer of the present disclosure, which may include beta carboxyethyl acrylate and a zinc salt of 3,5-di-tert-butylsalicylic acid, as well as monomers for the resin described above, for example styrene, butyl acrylate, combinations thereof, and the like.

pH Adjustment Agent

In some embodiments a pH adjustment agent may be added to control the rate of the emulsion aggregation process. The pH adjustment agent utilized in the processes of the present disclosure can be any acid or base that does not adversely affect the products being produced. Suitable bases can include metal hydroxides, such as sodium hydroxide, potassium hydroxide, ammonium hydroxide, and optionally combinations thereof. Suitable acids include nitric acid, sulfuric acid, hydrochloric acid, citric acid, acetic acid, and optionally combinations thereof.

Wax

Wax dispersions may also be added during formation of a latex polymer in an emulsion aggregation synthesis. Suitable waxes include, for example, submicron wax particles in the size range of from about 50 to about 1000 nanometers, in embodiments of from about 100 to about 500 nanometers in volume average diameter, suspended in an aqueous phase of water and an ionic surfactant, nonionic surfactant, or combinations thereof. Suitable surfactants include those described above. The ionic surfactant or nonionic surfactant may be present in an amount of from about 0.1 to about 20 percent by weight, and in embodiments of from about 0.5 to about 15 percent by weight of the wax. The wax dispersion according to embodiments of the present disclosure may include, for example, a natural vegetable wax, natural animal wax, mineral wax, and/or synthetic wax. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes of the present disclosure include, for example, Fischer-Tropsch wax, acrylate wax, fatty acid amide wax, silicone wax, polytetrafluoroethylene wax, polyethylene wax, polypropylene wax, and combinations thereof.

Examples of polypropylene and polyethylene waxes include those commercially available from Allied Chemical and Baker Petrolite, wax emulsions available from Michelman Inc. and the Daniels Products Company, EPOLENE N-15 commercially available from Eastman Chemical Products, Inc., VISCOL 550-P, a low weight average molecular weight polypropylene available from Sanyo Kasel K.K., and similar materials. In embodiments, commercially available polyethylene waxes possess a molecular weight (Mw) of from about 100 to about 5000, and in embodiments of from about 250 to about 2500, while the commercially available polypropylene waxes have a molecular weight of from about 200 to about 10,000, and in embodiments of from about 400 to about 5000.

In embodiments, the waxes may be functionalized. Examples of groups added to functionalize waxes include amines, amides, imides, esters, quaternary amines, and/or carboxylic acids. In embodiments, the functionalized waxes may be acrylic polymer emulsions, for example, JONCRYL 74, 89, 130, 537, and 538, all available from Johnson Diversey, Inc, or chlorinated polypropylenes and polyethylenes commercially available from Allied Chemical, Baker Petrolite Corporation and Johnson Diversey, Inc.

The wax may be present in an amount of from about 0.1 to about 30 percent by weight, and in embodiments from about 2 to about 20 percent by weight of the toner.

Colorants

The latex particles may be added to a colorant dispersion. The colorant dispersion may include, for example, submicron colorant particles having a size of, for example, from about 50 to about 500 nanometers in volume average diameter and, in embodiments, of from about 100 to about 400 nanometers in volume average diameter. The colorant particles may be suspended in an aqueous water phase containing an anionic surfactant, a nonionic surfactant, or combinations thereof. In embodiments, the surfactant may be ionic and may be from about 1 to about 25 percent by weight, and in embodiments from about 4 to about 15 percent by weight, of the colorant.

Colorants useful in forming toners in accordance with the present disclosure include pigments, dyes, mixtures of pigments and dyes, mixtures of pigments, mixtures of dyes, and the like. The colorant may be, for example, carbon black, cyan, yellow, magenta, red, orange, brown, green, blue, violet, or combinations thereof. In embodiments a pigment may be utilized. As used herein, a pigment includes a material that changes the color of light it reflects as the result of selective color absorption. In embodiments, in contrast with a dye which may be generally applied in an aqueous solution, a pigment generally is insoluble. For example, while a dye may be soluble in the carrying vehicle (the binder), a pigment may be insoluble in the carrying vehicle.

In embodiments wherein the colorant is a pigment, the pigment may be, for example, carbon black, phthalocyanines, quinacridones, red, green, orange, brown, violet, yellow, fluorescent colorants including RHODAMINE B™ type, and the like.

The colorant may be present in the toner of the disclosure in an amount of from about 1 to about 25 percent by weight of toner, in embodiments in an amount of from about 2 to about 15 percent by weight of the toner.

Exemplary colorants include carbon black like REGAL 330® magnetites; Mobay magnetites including MO8029™, MO8060™; Columbian magnetites; MAPICO BLACKS™ and surface treated magnetites; Pfizer magnetites including CB4799™, CB5300™, CB5600™, MCX6369™; Bayer magnetites including, BAYFERROX 8600™, 8610™; Northern Pigments magnetites including, NP-604™, NP-608™; Magnox magnetites including TMB-100™, or TMB-104™, HELIOGEN BLUE L6900™, D6840™, D7080™, D7020™, PYLAM OIL BLUE™ PYLAM OIL YELLOW™, PIGMENT BLUE 1™ available from Paul Uhlich and Company, Inc.; PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario; NOVAPERM YELLOW FGL™, HOSTAPERM PINK E™ from Hoechst; and CINQUASIA MAGENTA™ available from E.I. DuPont de Nemours and Company. Other colorants include 2,9-dimethyl-substituted quinacridone and anthraquinone dye identified in the Color Index as CI 60710, CI Dispersed Red 15, diazo dye identified in the Color Index as CI 26050, CI Solvent Red 19, copper tetra(octadecyl sulfonamido) phthalocyanine, x-copper phthalocyanine pigment listed in the Color Index as CI 74160, CI Pigment Blue, Anthrathrene Blue identified in the Color Index as CI 69810, Special Blue X-2137, diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Yellow 180 and Permanent Yellow FGL. Organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, Neopen Black X55, wherein the dyes are selected in various suitable amounts, for example from about 0.5 to about 20 percent by weight, in embodiments, from about 5 to about 18 weight percent of the toner.

In embodiments, colorant examples include Pigment Blue 15:3 having a Color Index Constitution Number of 74160, Magenta Pigment Red 81:3 having a Color Index Constitution Number of 45160:3, Yellow 17 having a Color Index Constitution Number of 21105, and known dyes such as food dyes, yellow, blue, green, red, magenta dyes, and the like.

In other embodiments, a magenta pigment, Pigment Red 122 (2,9-dimethylquinacridone), Pigment Red 185, Pigment Red 192, Pigment Red 202, Pigment Red 206, Pigment Red 235, Pigment Red 269, combinations thereof, and the like, may be utilized as the colorant. Pigment Red 122 (sometimes referred to herein as PR-122) has been widely used in the pigmentation of toners, plastics, ink, and coatings, due to its unique magenta shade. The chemical structures of PR-122, Pigment Red 269, and Pigment Red 185 (sometimes referred to herein as PR-185) are set forth below.

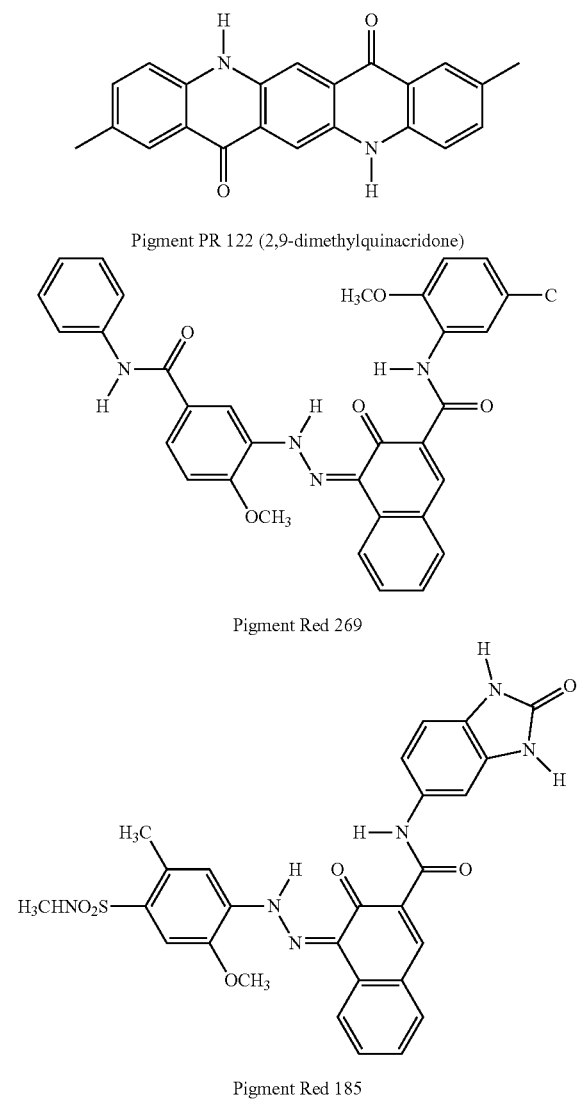

Reaction Conditions

In the emulsion aggregation process, the reactants may be added to a suitable reactor, such as a mixing vessel. A blend of latex, optional colorant dispersion, wax, and aggregating agent, may then be stirred and heated to a temperature near the Tg of the latex, in embodiments from about 30° C. to about 70° C., in embodiments from about 40° C. to about 65° C., resulting in toner aggregates of from about 3 microns to about 15 microns in volume average diameter, in embodiments of from about 5 microns to about 9 microns in volume average diameter.

In embodiments, a shell may be formed on the aggregated particles. Any latex utilized noted above to form the core latex may be utilized to form the shell latex. In embodiments, a styrene-n-butyl acrylate copolymer may be utilized to form the shell latex. In embodiments, the latex utilized to form the shell may have a glass transition temperature of from about 35° C. to about 75° C., in embodiments from about 40° C. to about 70° C. In embodiments, a shell may be formed on the aggregated particles including a blend of a first latex for the core and a latex incorporated with a CCA.

Where present, a shell latex may be applied by any method within the purview of those skilled in the art, including dipping, spraying, and the like. The shell latex may be applied until the desired final size of the toner particles is achieved, in embodiments from about 3 microns to about 12 microns, in other embodiments from about 4 microns to about 8 microns. In other embodiments, the toner particles may be prepared by in-situ seeded semi-continuous emulsion copolymerization of the latex with the addition of the shell latex once aggregated particles have formed.

Coagulants

In embodiments, a coagulant may be added during or prior to aggregating the latex and the aqueous colorant dispersion. The coagulant may be added over a period of time from about 1 minute to about 60 minutes, in embodiments from about 1.25 minutes to about 20 minutes, depending on the processing conditions.

Examples of suitable coagulants include polyaluminum halides such as polyaluminum chloride (PAC), or the corresponding bromide, fluoride, or iodide, polyaluminum silicates such as polyaluminum sulfo silicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, combinations thereof, and the like. One suitable coagulant is PAC, which is commercially available and can be prepared by the controlled hydrolysis of aluminum chloride with sodium hydroxide. Generally, PAC can be prepared by the addition of two moles of a base to one mole of aluminum chloride. The species is soluble and stable when dissolved and stored under acidic conditions if the pH is less than about 5. The species in solution is believed to contain the formula $Al_{13}O_4(OH)_{24}(H_2O)_{12}$ with about 7 positive electrical charges per unit.

In embodiments, suitable coagulants include a polymetal salt such as, for example, polyaluminum chloride (PAC), polyaluminum bromide, or polyaluminum sulfosilicate. The polymetal salt can be in a solution of nitric acid, or other diluted acid solutions such as sulfuric acid, hydrochloric acid, citric acid or acetic acid. The coagulant may be added in amounts from about 0.01 to about 5 percent by weight of the toner, and in embodiments from about 0.1 to about 3 percent by weight of the toner.

Aggregating Agents

Any aggregating agent capable of causing complexation might be used in forming toner of the present disclosure. Both alkali earth metal or transition metal salts can be utilized as aggregating agents. In embodiments, alkali (II) salts can be selected to aggregate sodium sulfonated polyester colloids with a colorant to enable the formation of a toner composite. Such salts include, for example, beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, strontium sulfate, barium chloride, barium bromide, barium iodide, and optionally combinations thereof. Examples of transition metal salts or anions which may be utilized as aggregating agent include acetates of vanadium, niobium, tantalum, chromium, molybdenum, tungsten, manganese, iron, ruthenium, cobalt, nickel, copper, zinc, cadmium or silver; acetoacetates of vanadium, niobium, tantalum, chromium, molybdenum, tungsten, manganese, iron, ruthenium, cobalt, nickel, copper, zinc, cadmium or silver; sulfates of vanadium, niobium, tantalum, chromium, molybdenum, tungsten, manganese, iron, ruthenium, cobalt, nickel, copper, zinc, cadmium or silver; and aluminum salts such as aluminum acetate, aluminum halides such as polyaluminum chloride, combinations thereof, and the like.

The resulting blend of latex, optionally in a dispersion, CCA, optionally in dispersion, optional colorant dispersion, optional wax, optional coagulant, and optional aggregating agent, may then be stirred and heated to a temperature below the Tg of the latex, in embodiments from about 30° C. to about 70° C., in embodiments of from about 40° C. to about 65° C., for a period of time from about 0.2 hours to about 6 hours, in embodiments from about 0.3 hours to about 5 hours, resulting in toner aggregates of from about 3 microns to about 15 microns in volume average diameter, in embodiments of from about 4 microns to about 8 microns in volume average diameter.

Once the desired final size of the toner particles is achieved, the pH of the mixture may be adjusted with a base to a value of from about 3.5 to about 7, and in embodiments from about 4 to about 6.5. The base may include any suitable base such as, for example, alkali metal hydroxides such as, for example, sodium hydroxide, potassium hydroxide, and ammonium hydroxide. The alkali metal hydroxide may be added in amounts from about 0.1 to about 30 percent by weight of the mixture, in embodiments from about 0.5 to about 15 percent by weight of the mixture.

The mixture of latex, CCA, optional colorant, and optional wax may be subsequently coalesced. Coalescing may include stirring and heating at a temperature of from about 80° C. to about 99° C., in embodiments from about 85° C. to about 98° C., for a period of from about 0.5 hours to about 12 hours, and in embodiments from about 1 hour to about 6 hours. Coalescing may be accelerated by additional stirring.

The pH of the mixture may then be lowered to from about 3.5 to about 6, in embodiments from about 3.7 to about 5.5, with, for example, an acid to coalesce the toner aggregates. Suitable acids include, for example, nitric acid, sulfuric acid, hydrochloric acid, citric acid or acetic acid. The amount of acid added may be from about 0.1 to about 30 percent by weight of the mixture, and in embodiments from about 1 to about 20 percent by weight of the mixture.

The mixture is cooled in a cooling or freezing step. Cooling may be at a temperature of from about 20° C. to about 40° C., in embodiments from about 22° C. to about 30° C. over a period time from about 1 hour to about 8 hours, and in embodiments from about 1.5 hours to about 5 hours.

In embodiments, cooling a coalesced toner slurry includes quenching by adding a cooling medium such as, for example, ice, dry ice and the like, to effect rapid cooling to a temperature of from about 20° C. to about 40° C., and in embodiments of from about 22° C. to about 30° C. Quenching may be feasible for small quantities of toner, such as, for example, less than about 2 liters, in embodiments from about 0.1 liters to about 1.5 liters. For larger scale processes, such as for example greater than about 10 liters in size, rapid cooling of the toner mixture may not be feasible or practical, neither by the introduction of a cooling medium into the toner mixture, nor by the use of jacketed reactor cooling.

After this cooling, the aggregate suspension may be heated to a temperature at or above the Tg of the latex. Where the particles have a core-shell configuration, heating may be above the Tg of the first latex used to form the core and the Tg of the second latex used to form the shell, to fuse the shell latex with the core latex. In embodiments, the aggregate suspension may be heated to a temperature of from about 80° C. to about 120° C., in embodiments from about 85° C. to about 98° C., for a period of time from about 1 hour to about 6 hours, in embodiments from about 2 hours to about 4 hours.

The toner slurry may then be washed. Washing may be carried out at a pH of from about 7 to about 12, and in embodiments at a pH of from about 9 to about 11. The washing may be at a temperature of from about 30° C. to about 70° C., and in embodiments from about 40° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry is adjusted with an acid, and followed optionally by one or more deionized water washes.

Drying may be carried out at a temperature of from about 35° C. to about 75° C., and in embodiments of from about 45° C. to about 60° C. The drying may be continued until the moisture level of the particles is below a set target of about 1% by weight, in embodiments of less than about 0.7% by weight.

Toner particles may possess a CCA, in embodiments a CCA incorporated into a latex, in amounts of from about 0.01 percent by weight to about 10 percent by weight of the toner particles, in embodiments from about 0.2 percent by weight to about 8 percent by weight of the toner particles. As noted above, the toner particles may possess CCA latex in the core, shell, or a combination of both. When in a combination of core and shell, the ratio of CCA latex in the core to the shell may be from about 1:99 to about 99:1, and all combinations in between. In embodiments, toners of the present disclosure possessing a CCA that has been added during the EA process as a dispersion may have a triboelectric charge of from about −2 μC/g to about −60 μC/g, in embodiments from about −10 μC/g to about −40 μC/g. Toners of the present disclosure may also possess a parent toner charge per mass ratio (Q/M) of from about −3 μC/g to about −35 μC/g, and a final toner charging after surface additive blending of from −10 μC/g to about −45 μC/g.

Additives

Further optional additives which may be combined with a toner include any additive to enhance the properties of toner compositions. Included are surface additives, color enhancers, etc. Surface additives that can be added to the toner compositions after washing or drying include, for example, metal salts, metal salts of fatty acids, colloidal silicas, metal oxides, strontium titanates, combinations thereof, and the like, which additives are each usually present in an amount of from about 0.1 to about 10 weight percent of the toner, in embodiments from about 0.5 to about 7 weight percent of the toner. Examples of such additives include, for example, those disclosed in U.S. Pat. Nos. 3,590,000, 3,720,617, 3,655,374 and 3,983,045, the disclosures of each of which are hereby incorporated by reference in their entirety. Other additives include zinc stearate and AEROSIL R972® available from Degussa. The coated silicas of U.S. Pat. No. 6,190,815 and U.S. Pat. No. 6,004,714, the disclosures of each of which are hereby incorporated by reference in their entirety, can also be selected in amounts, for example, of from about 0.05 to about 5 percent by weight of the toner, in embodiments from about 0.1 to about 2 percent by weight of the toner. These additives can be added during the aggregation or blended into the formed toner product.

Toner particles produced utilizing a latex of the present disclosure may have a size of about 1 micron to about 20 microns, in embodiments about 2 microns to about 15 microns, in embodiments about 3 microns to about 7 microns. Toner particles of the present disclosure may have a circularity of from about 0.9 to about 0.99, in embodiments from about 0.92 to about 0.98.

Following the methods of the present disclosure, toner particles may be obtained having several advantages compared with conventional toners: (1) increase in the robustness of the particles' triboelectric charging, which reduces toner defects and improves machine performance; (2) easy to implement, no major changes to existing aggregation/coalescence processes; and (3) increase in productivity and reduction in unit manufacturing cost (UMC) by reducing the production time and the need for rework (quality yield improvement).

Uses

Toner in accordance with the present disclosure can be used in a variety of imaging devices including printers, copy machines, and the like. The toners generated in accordance with the present disclosure are excellent for imaging processes, especially xerographic processes and are capable of providing high quality colored images with excellent image resolution, acceptable signal-to-noise ratio, and image uniformity. Further, toners of the present disclosure can be selected for electrophotographic imaging and printing processes such as digital imaging systems and processes.

Developer compositions can be prepared by mixing the toners obtained with the processes disclosed herein with known carrier particles, including coated carriers, such as steel, ferrites, and the like. Such carriers include those disclosed in U.S. Pat. Nos. 4,937,166 and 4,935,326, the entire disclosures of each of which are incorporated herein by reference. The carriers may be present from about 2 percent by weight of the toner to about 8 percent by weight of the toner, in embodiments from about 4 percent by weight to about 6 percent by weight of the toner. The carrier particles can also include a core with a polymer coating thereover, such as polymethylmethacrylate (PMMA), having dispersed therein a conductive component like conductive carbon black. Carrier coatings include silicone resins such as methyl silsesquioxanes, fluoropolymers such as polyvinylidiene fluoride, mixtures of resins not in close proximity in the triboelectric series such as polyvinylidiene fluoride and acrylics, thermosetting resins such as acrylics, combinations thereof and other known components.

Development may occur via discharge area development. In discharge area development, the photoreceptor is charged and then the areas to be developed are discharged. The development fields and toner charges are such that toner is repelled by the charged areas on the photoreceptor and attracted to the discharged areas. This development process is used in laser scanners. Development may be accomplished by the magnetic brush development process disclosed in U.S. Pat. No. 2,874,063, the disclosure of which is hereby incorporated by reference in its entirety. This method entails the carrying of a developer material containing toner of the present disclosure and magnetic carrier particles by a magnet. The magnetic field of the magnet causes alignment of the magnetic carriers in a brush like configuration, and this "magnetic brush" is brought into contact with the electrostatic image bearing surface of the photoreceptor. The toner particles are drawn from the brush to the electrostatic image by electrostatic attraction to the discharged areas of the photoreceptor, and development of the image results. In embodiments, the conductive magnetic brush process is used wherein the developer includes conductive carrier particles and is capable of conducting an electric current between the biased magnet through the carrier particles to the photoreceptor.

Imaging

Imaging methods are also envisioned with the toners disclosed herein. Such methods include, for example, some of the above patents mentioned above and U.S. Pat. Nos. 4,265,990, 4,584,253 and 4,563,408, the entire disclosures of each of which are incorporated herein by reference. The imaging process includes the generation of an image in an electronic printing magnetic image character recognition apparatus and thereafter developing the image with a toner composition of the present disclosure. The formation and development of images on the surface of photoconductive materials by electrostatic means is well known. The basic xerographic process involves placing a uniform electrostatic charge on a photoconductive insulating layer, exposing the layer to a light and shadow image to dissipate the charge on the areas of the layer exposed to the light, and developing the resulting latent electrostatic image by depositing on the image a finely-divided electroscopic material, for example, toner. The toner will normally be attracted to those areas of the layer, which retain a charge, thereby forming a toner image corresponding to the latent electrostatic image. This powder image may then be transferred to a support surface such as paper. The transferred image may subsequently be permanently affixed to the support surface by heat. Instead of latent image formation by uniformly charging the photoconductive layer and then exposing the layer to a light and shadow image, one may form the latent image by directly charging the layer in image configuration. Thereafter, the powder image may be fixed to the photoconductive layer, eliminating the powder image transfer. Other suitable fixing means such as solvent or overcoating treatment may be substituted for the foregoing heat fixing step.

The following Examples are being submitted to illustrate embodiments of the present disclosure. These Examples are intended to be illustrative only and are not intended to limit the scope of the present disclosure. Also, parts and percentages are by weight unless otherwise indicated.

EXAMPLES

Example 1

A monomer mixture of about 61 parts by weight of styrene, obtained from Shell Corporation and about 33 parts by weight of n-butyl acrylate, obtained from Scientific Polymer Products, at a weight ratio of about 75:25, was combined with about 0.8 parts by weight of 1,10-decamethylene glycol diacrylate, obtained from Bimax, in an amount of about 3% by weight based on the total weight of styrene/n-butyl acrylate, and about 2.8 parts by weight of 3,5 Di-tert-butylsalicylic acid, zinc salt CCA, obtained from Orient Corporation of America, in an amount of about 3% by weight based upon the total weight of the styrene/n-butyl acrylate. To this mixture, at which point the CCA was not fully soluble, was added about 2.82 parts by weight of β-carboxyethyl acrylate (β-CEA), obtained from Bimax in an amount of about 3% by weight based on the total weight of styrene/n-butyl acrylate. Upon stirring the monomer mixture for about 20 minutes, the 3,5 Di-tert-butylsalicylic acid, zinc salt was fully solubilized and incorporated into the monomer mixture.

A latex resin was prepared by emulsion polymerization of the above monomer mix as follows.

A 2 liter jacketed glass reactor was fitted with a stainless steel 45° pitch semi-axial flow impeller, a thermal couple temperature probe, a water cooled condenser with nitrogen outlet, a nitrogen inlet, internal cooling capabilities, and a hot water circulating bath. After reaching a jacket temperature of about 81° C. and continuous nitrogen purge, the reactor was charged with about 71 parts by weight of distilled water and about 3.5 parts by weight of DOWFAX™ 2A1, an alkyldiphenyloxide disulfonate from The Dow Chemical Company. The stirrer was set at about 200 revolutions per minute (rpm) and maintained at this speed for about 1 hour with the reactor contents kept at a temperature of about 75° C. with the internal cooling system.

About 1.5 parts by weight of the monomer mixture prepared above was transferred into the reactor and stirred for about 10 minutes to maintain a stable emulsion and allow the reactor contents to equilibrate at about 75° C. An initiator solution prepared from about 0.40 parts by weight of ammonium persulfate, obtained from FMC, and about 1 part by weight of distilled water was then added all at once by syringe. Stirring continued for about an additional 12 minutes to complete seed particle formation. The remaining monomer, about 333.4 grams, was then fed continuously into the reactor over a period of about 100 minutes. After the addition of the monomer was completed, the reactor contents were stirred for an additional 180 minutes at about 75° C. At this time the reactor and contents were cooled to room temperature and the resulting latex removed.

The resulting latex resin possessed a volume average diameter of about 37 nanometers measured on a Honeywell MICROTRAC® UPA 150 light scattering instrument.

Comparative Example 1

A latex emulsion polymerization was performed in the absence of the 3,5 Di-tert-butylsalicylic acid, zinc salt as follows. A monomer mixture of about 74 parts by weight of styrene, obtained from Shell Corporation, and about 25 parts by weight of n-butyl acrylate, obtained from Scientific Polymer Products, at a weight ratio of about 75:25, was combined with about 1.5 parts by weight of acrylic acid obtained from Scientific Polymer Products, in an amount of about 3% by weight based on the total weight of styrene/n-butyl acrylate.

An 8 liter jacketed glass reactor was fitted with a stainless steel 45° pitch semi-axial flow impeller, a thermal couple temperature probe, a water cooled condenser with nitrogen outlet, a nitrogen inlet, internal cooling capabilities, and a hot water circulating bath. After reaching a jacket temperature of about 83° C. and continuous nitrogen purge, the reactor was charged with about 72 parts by weight of distilled water and about 1.8 parts by weight of DOWFAX™ 2A1, an alkyldiphenyloxide disulfonate from The Dow Chemical Company. The stirrer was set at about 220 revolutions per minute (rpm) and maintained at that speed for about 105 minutes with the reactor contents kept at a temperature of about 75° C. with the internal cooling system.

About 1.2 parts by weight of the above monomer mixture was transferred into the reactor and stirred for about 10 minutes to maintain a stable emulsion and allow the reactor contents to equilibrate at about 75° C. An initiator solution prepared from about 0.4 parts by weight of ammonium persulfate, obtained from FMC, and about 1.7 parts by weight of distilled water, was then added all at once by syringe. Stirring continued for about an additional 12 minutes to complete seed particle formation. The remaining monomer, about 23 parts by weight, was then fed continuously into the reactor over a period of about 100 minutes. After the addition of the monomer was completed, the reactor contents were stirred for about an additional 263 minutes at about 75° C. At this time the reactor and contents were cooled to room temperature and the latex removed.

The resulting latex resin possessed a volume average diameter of about 46 nanometers measured on a Honeywell MICROTRAC® UPA 150 light scattering instrument.

After the emulsion polymerization was concluded, the physical properties of the latex obtained with the CCA were the same as those for the control latex without CCA in that a stable emulsion was achieved. Approximately 100 grams of each latex (i.e., the latex with the CCA and the control EA latex with out the CCA), was diluted by an equal volume of about 100 mL of distilled water and then freeze dried to obtain a fine dry powder. The freeze dried latex of each example was combined with a 65 micron bare carrier core at a nominal 2% toner concentration, based on the core weight, and roll milled for about 60 minutes, with triboelectric charge measurements taken at about 10 minutes, about 30 minutes, and about 60 minutes.

The results are summarized below in Tables 1 and 2 and the accompanying FIGURE, with Table 1 showing the results obtained for the freeze dried latex possessing CCA of Example 1, and Table 2 showing the results obtained for the control freeze dried latex (not possessing CCA) of Example 2. As used in the Tables and the FIGURE, RM Time is the time of roll milling, TC is toner concentration based on toner blow-off, Q/M is the toner charge per mass ratio, TCP is the toner concentration product (TC×Q/M), and Norm Q/M is the normalized Q/M.

TABLE 1

Latex with 3,5 Di-tert-butylsalicylic acid, zinc salt incorporation
RM at 2% TC, 100 grams bare core in 4 oz jar (EXAMPLE 1)

| RM Time (minutes) | TC | Q/M | TCP | Norm QM |
|---|---|---|---|---|
| 10 | 1.13 | 52.7 | 59.6 | 402.0 |
| 30 | 1.02 | 45.6 | 46.3 | 342.7 |
| 60 | 1.04 | 40.5 | 42.0 | 305.4 |

TABLE 2

Latex Control (Comparative Example 1)
RM at 2% TC, 100 grams bare core in 4 oz jar

| RM Time (minutes) | TC | Q/M | TCP | Norm QM |
|---|---|---|---|---|
| 10 | 0.71 | 34.7 | 24.7 | 250.2 |
| 30 | 0.81 | 30.8 | 24.8 | 224.9 |
| 60 | 0.51 | 12.6 | 6.5 | 88.4 |

As can be seen from the above Tables and the FIGURE, latex particles prepared with the solubilized 3,5 Di-tert-butylsalicylic acid, zinc salt had a significantly higher charge than the control. Furthermore, the latex particles prepared with the solubilized 3,5 Di-tert-butylsalicylic acid, zinc salt were in a steady state after about 60 minutes, as compared to the control which was still dropping in charge (see the FIGURE).

Thus, the above data demonstrate that the processes of the present disclosure may be utilized to form emulsions possessing a CCA, such as 3,5 Di-tert-butylsalicylic acid, zinc salt, with an emulsion particle size of about 37 nm.

Example 2

Preparation of a larger particle size latex incorporating a charge control additive. A monomer mixture of about 66 parts by weight of styrene, obtained from Shell Corporation, and about 22 parts by weight of n-butyl acrylate, obtained from Scientific Polymer Products, at a weight ratio of about 75:25, was combined with about 0.4 parts by weight of 1-Dodecanethiol, obtained from Sigma-Aldrich, in an amount of about 0.46% by weight based on the total weight of styrene/n-butyl acrylate, and about 3.3 parts by weight of 3,5 Di-tert-butylsalicylic acid, zinc salt CCA, obtained from Orient Corporation of America, in an amount of about 4% by weight based upon the total weight of the styrene/n-butyl acrylate. To this mixture, at which point the CCA was not fully soluble, was added about 2.6 parts by weight of β-carboxyethyl acrylate (β-CEA), obtained from Bimax, in an amount of about 3% by weight based on the total weight of styrene/n-butyl acrylate. Upon stirring the monomer mixture for about 20 minutes, the 3,5 Di-tert-butylsalicylic acid, zinc salt was fully solubilized and incorporated into the monomer mixture.

A seed monomer mixture was prepared of about 4 parts by weight of styrene, about 1.4 parts by weight of n-Butyl acrylate, about 0.02 parts by weight of 1-Dodecanethiol, and about 0.17 parts by weight of β-CEA.

A latex resin was prepared by emulsion polymerization of the above monomer mixtures as follows.

A 2 liter jacketed glass reactor was fitted with a stainless steel 45° pitch semi-axial flow impeller, a thermal couple temperature probe, a water cooled condenser with nitrogen outlet, a nitrogen inlet, internal cooling capabilities, and a hot water circulating bath. After reaching a jacket temperature of about 83° C. and continuous nitrogen purge, the reactor was charged with about 91 parts by weight of distilled water and about 0.17 parts by weight of DOWFAX™ 2A1, an alkyldiphenyloxide disulfonate from The Dow Chemical Company. The stirrer was set at about 170 revolutions per minute (rpm) and maintained at this speed for about 1 hour with the reactor contents kept at a temperature of about 75° C. with the internal cooling system.

About 1.4 parts by weight of the above seed monomer mixture was transferred into the reactor and stirred for about 10 minutes to maintain a stable emulsion and allow the reactor contents to equilibrate at about 75° C. An initiator solution prepared from about 1.31 parts by weight of ammonium persulfate, obtained from FMC, and about 4.5 parts by weight of distilled water was then added over a period of about 20 minutes. Stirring was continued for about an additional 20 minutes to complete seed particle formation. At this time about 1.23 parts by weight of DOWFAX™ 2A1 was added in about 4 minutes, followed by commencement of the main monomer feed of the above monomer mixture containing the dissolved 3,5 Di-tert-butylsalicylic acid, zinc salt, at a feed rate of about 0.4 parts by weight per minute. After about 125 minutes of monomer feed, or about 50 parts by weight of monomer, an addition of about 0.4 parts by weight of DOWFAX™ 2A1 was made. Monomer feed continued until a total of about 58 parts by weight was added, completing the monomer addition, followed by an addition of about 0.18 parts by weight of DOWFAX™ 2A1. The reactor contents were then stirred for about an additional 240 minutes at about 75° C., during which time an additional 0.18 parts by weight of DOWFAX™ 2A1 was added, to complete monomer conversion.

At this time the reactor and contents were cooled to room temperature and the latex removed and filtered.

The resulting latex resin possessed a volume average diameter of about 215 nanometers and a distribution width of about 0.108 as measured on a Honeywell MICROTRAC® UPA 150 light scattering instrument and a total solids content of about 38.3%

Example 3

Core latex emulsion preparation. A monomer emulsion was prepared by agitating a monomer mixture (about 29 parts by weight of styrene, about 9.8 parts by weight of n-butyl acrylate, about 1.17 parts by weight of beta-carboxyethyl acrylate (CEA) and about 0.20 parts by weight of 1-dodecanethiol) with an aqueous solution (about 0.77 parts by weight of DOWFAX™ 2A1 (an alkyldiphenyloxide disulfonate surfactant from Dow Chemical)), and about 18.5 parts by weight of deionized water) at about 500 revolutions per minute (rpm) at a temperature from about 20° C. to about 25° C.

About 0.06 parts by weight of DOWFAX™ 2A1 and about 36 parts by weight of deionized water were charged in a 8 liter jacketed glass reactor fitted with a stainless steel 45° pitch semi-axial flow impeller at about 200 rpm, a thermal couple temperature probe, a water cooled condenser with nitrogen outlet, a nitrogen inlet, internal cooling capabilities, and a hot water circulating bath set at about 83° C., and de-aerated for about 30 minutes while the temperature was raised to about 75° C.

About 1.2 parts by weight of the monomer emulsion described above was then added into the reactor and was stirred for about 10 minutes at about 75° C. An initiator solution prepared from about 0.78 parts by weight of ammonium persulfate in about 2.7 parts by weight of deionized water was added to the reactor over about 20 minutes. Stirring continued for about an additional 20 minutes to allow seed particle formation. The remaining monomer emulsion was then fed into the reactor over about 190 minutes. After the addition, the latex was stirred at the same temperature for about 3 more hours. The final latex particle produced by this procedure had a size of about 240 nm, as measured on a Honeywell MICROTRAC® UPA 150 light scattering instrument.

Example 4

Another latex emulsion including crosslinked polymer particles was prepared using similar emulsion polymerization techniques as in the above examples. About 61 parts by weight of styrene, about 33 parts by weight of n-butyl acrylate, about 3 parts by weight of divinyl benzene, and about 3 parts by weight of beta-carboxyethyl acrylate were combined, with the difference being that the chain transfer agent dodecanethiol was excluded. The final particle size was about 50 nm as measured on a Honeywell MICROTRAC® UPA 150 light scattering instrument.

Comparative Example 2

To a 2 liter jacketed glass reactor, about 19 parts by weight of the latex prepared in Example 3 above was combined with about 4.3 parts by weight of a Regal 330 pigment dispersion, about 1.1 parts by weight of a Sun PB 15:3 pigment dispersion (from Sun Chemicals Co.), about 6.4 parts by weight of a paraffin wax dispersion, about 5.5 parts by weight of the latex prepared in Example 4 above, and about 47 parts by weight of distilled water. The components were mixed by a homogenizer for about 5 minutes. A separate mixture of about 0.3 parts by weight of poly(aluminum chloride) (from Asada Co.) in about 2.6 parts by weight of 0.02 M of HNO3 solution was added dropwise into the reactor. After the addition of the poly(aluminum chloride) mixture, the resulting viscous slurry was homogenized at about 20° C. for about 20 minutes. The homogenizer was removed and replaced with a stainless steel 45° pitch semi-axial flow impeller and stirred continuously throughout the process. The temperature of the contents of the reactor was then raised to about 58° C., and held at this temperature until the particle size was about 6.6 microns.

Shell addition. About 14 parts by weight of the latex prepared above in Example 3 was then added dropwise. After the addition of the latex, the resulting slurry was stirred for about 30 minutes, at which time sufficient 1 molar NaOH was added into the slurry to adjust the pH to about 4.5. After mixing for an additional 2 minutes after pH adjustment, the bath temperature was adjusted to about 100° C. to heat the slurry to about 96° C. During the temperature increase to 96° C. the pH of the slurry was adjusted to about 3.5 to 3.6 by the addition of 0.3 M HNO3 solution. The slurry was then coalesced for about 2.5 hours at a temperature of about 96° C. The toner particles thus obtained were collected by filtration. After washing and drying, the diameter of the resulting toner particles was about 7.2 microns.

Comparative Example 3

A second control toner particle was made identical to Comparative Example 2 in that the quantities and same raw materials were used. The slurry was coalesced for about 3 hours at a temperature of about 96° C. instead of 2.5 hours at a temperature of about 96° C. The toner particles thus obtained were collected by filtration. After washing and drying, the diameter of the resulting toner particles was about 7.2 microns.

Example 5

Toner particle preparation. To a 2 liter jacketed glass reactor, about 19 parts by weight of the latex prepared in Example 3 above was combined with about 4.3 parts by weight of a Regal 330 pigment dispersion, about 1.1 parts by weight of a Sun PB 15:3 pigment dispersion (from Sun Chemicals Co.), about 6.4 parts by weight of a wax dispersion, about 5.5 parts by weight of the latex prepared in Example 4 above, and about 47 parts by weight of distilled water. The components were mixed by a homogenizer for about 5 minutes. A separate mixture of about 0.3 parts by weight of poly(aluminum chloride) (from Asada Co.) in about 2.6 parts by weight of 0.02 M of HNO3 solution was added dropwise into the reactor. After the addition of the poly(aluminum chloride) mixture, the resulting viscous slurry was homogenized at about 20° C. for about 20 minutes. The homogenizer was removed and replaced with a stainless steel 45° pitch semi-axial flow impeller and stirred continuously throughout the process. The temperature of the reactor contents was then raised to about 58° C., and held at this temperature until the particle size was about 6.5 microns.

Shell addition. A shell latex as in Comparative Examples 2 and 3 was modified by substituting about 20% of the core latex from Example 3, with the latex from Example 2. Thus, a mixture of about 11 parts by weight of the latex prepared above in Example 3 and about 3 parts by weight of latex prepared above in Example 2, with incorporated 3,5 Di-tert-butylsalicylic acid, zinc salt CCA, obtained from Orient Corporation of America, was added dropwise to form a shell. After the addition of the latex, the resulting slurry was stirred for about 30 minutes, at which time sufficient 1 molar NaOH was added into the slurry to adjust the pH to about 4.5. After mixing for an additional 2 minutes after pH adjustment, the bath temperature was adjusted to about 100° C. to heat the slurry to about 96° C. During the temperature increase to 96° C., the pH of the slurry was adjusted to about 3.5 to 3.6 by the addition of 0.3 M HNO3 solution. The slurry was then coalesced for about 4.5 hours at a temperature of about 96° C. The toner particles thus obtained were collected by filtration. After washing and drying, the diameter of the resulting toner particles was about 7.3 microns.

The toner particles of the above examples were surface blended with a mixture of about 50 nm silica and of about a 140 nm sol-gel silica in a Fuji Powder Blender. The toners were then tested in a machine fixture that was modified to obtain the triboelectric charge (μC/g) of the toner directly from the donor roll. As can be seen the toners of Comparative Examples 2 and 3, with 100% core latex from Example 3 as a shell, had a reproducible triboelectric charge of about 11 μC/g. The toner of Example 5, however, had a triboelectric charge that was almost double that of the toners of Comparative Examples 2 and 3 due to the latex of Example 2, with incorporated 3,5 Di-tert-butylsalicylic acid, zinc salt.

| Toner | Tribo (μC/g) |
|---|---|
| Comparative Example 2 | −10.65 |
| Comparative Example 3 | −10.69 |
| Example 5 | −19.25 |

The particles made in Examples 1 and 2 were negatively charged and capable of being used by themselves as a CCA. Further, the latex prepared in Example 3, with incorporated 3,5 Di-tert-butylsalicylic acid, zinc salt, when used in the toner particle shell as part of the shell latex, demonstrated the ability to provide a more negative charge to the toner particle. In accordance with the present disclosure, the process of the present disclosure provides an alternative way to incorporate negatively charged latex into the toner matrix by the EA process.

Example 6

This Example describes the synthesis of latex with low CCA content without reactor fouling.

Emulsion aggregation (EA) latex was synthesized with about 0.8% of 3,5 di-tert-butylsalicylic acid, zinc salt as the charge control agent (BONTRON E-84, available from Orient Corporation of America) by the emulsion polymerization process described below.

A monomer mixture of about 1535.0 parts by weight of styrene, (available from Scientific Polymer Products, Ontario, N.Y.), and about 367.0 parts by weight of n-butyl acrylate, (available from Scientific Polymer Products), at a weight ratio of about 81:19, was combined with about 26.3 parts by weight of 1-dodecanethiol (available from Sigma-Aldrich, St. Louis, Mo.), in an amount of about 1.38 wt % based on the total weight of styrene/n-butyl acrylate, and about 57.1 parts by weight of 3,5 di-tert-butylsalicylic acid, zinc salt in an amount of about 0.8 wt % based upon the total weight of the styrene/n-butyl acrylate. To this mixture, at which point the charge control agent was not fully soluble, was added about 57.0 parts by weight of β-carboxyethyl acrylate (β-CEA, available from Bimax, Glen Rock, Pa.), in an amount of about 3 wt % based on the total weight of styrene/n-butyl acrylate. Upon stirring the monomer mixture for about 20 minutes, the 3,5 di-tert-butylsalicylic acid, zinc salt was fully solubilized and incorporated into the monomer mixture.

A seed monomer mixture was prepared from about 34.5 parts by weight of styrene, about 8.3 parts by weight of n-Butyl acrylate, about 0.6 parts by weight of 1-Dodecanethiol, and about 1.28 parts by weight of β-CEA.

A surfactant feed stock solution was prepared from about 750 parts by weight distilled water and about 48.0 parts by weight of DOWFAX™ 2A1, an alkyldiphenyloxide disulfonate of The Dow Chemical Company.

A latex resin was then prepared by emulsion polymerization of the above monomer mixtures as follows. An 8 liter jacketed glass reactor was fitted with stainless steel 45° pitch semi-axial flow impellers, a thermal couple temperature probe, a water cooled condenser with nitrogen outlet, a nitrogen inlet, internal cooling capabilities, and a hot water circulating bath. After reaching a jacket temperature of about 84° C. and continuous nitrogen purge, the reactor was charged with about 1927 parts by weight of distilled water and about 7.2 parts by weight of DOWFAX™ 2A1, an alkyldiphenyloxide disulfonate from The Dow Chemical Company. The stirrer was set at about 170 revolutions per minute (rpm) and maintained at this speed for about 1 hour with the reactor contents kept at a temperature of about 75° C. using the internal cooling system.

The seed monomer mixture was transferred into the reactor and stirred for about 20 minutes to maintain a stable emulsion and allow the reactor contents to equilibrate at about 75° C. An initiator solution prepared from about 38.0 parts by weight of ammonium persulfate, obtained from FMC, and about 132.0 parts by weight of distilled water was then added over a period of about 20 minutes. Stirring was continued for about an additional 20 minutes to complete seed particle formation. The resulting seed particles had a size of about 41 nm, as measured on a Honeywell MICROTRAC® UPA 150 light scattering instrument.

At this time, the main monomer feed of the monomer mixture containing the dissolved 3,5 Di-tert-butylesalicylic acid, zinc salt, was added at a feed rate of about 7.5 parts by weight per minute, with simultaneous addition of the surfactant feed stock solution at a feed rate of about 3.0 parts by weight per minute.

Monomer feed and surfactant solution feed were continued for about 270 minutes until a total of about 2000.0 parts by weight of monomer feed and total of about 799.0 parts of surfactant/water feed were added, completing the monomer and surfactant addition. The reactor contents were then stirred for about an additional 240 minutes at about 75° C. while under a continuous nitrogen atmosphere, to complete monomer conversion.

At this time the reactor and contents were cooled to room temperature, and the latex was removed and filtered. The resulting latex particle size had a volume average diameter of about 168 nm, as measured on a Honeywell MICROTRAC® UPA 150 light scattering instrument.

Example 7

Preparation of EA particles with a latex without charge control agent (reference particle) was performed as a control. Emulsion aggregation particles were prepared, as in examples above, using a latex synthesized without charge control agent. EA particles had been prepared by standard aggregation/coalescence process using latex without charge control agent for core and shell. Particles with a final size of 6.27 microns with narrow size distribution as measured by geometric size distribution (GSD) of 1.18 volume (GSD) 84/50 and a 1.22 number GSD 50/16 (GSD 1.18/1.22). For a median volume (G50) of 6.27 microns as in this example the particle geometric size distribution at 84% and 50% are taken as the ratio of 84/50 in this case 7.40/6.27 to provide 1.18. In a similar manner, the number median in this case its number median 50%/16% or about 5.68/4.68, or about 1.22. These measurements provide an indication of how broad or narrow the particle size distribution is. Particles produced had a circularity of 0.976. Particles were washed in a 3 step process using de-ionized (DI) water, acid and DI water. Particles were dried and SCD triboelectric charge measurement was performed on these particles. A-zone triboelectric charged was measured at −23.1 uC/g.

Example 8

EA particles prepared using the above low loading CCA latex incorporated with 0.8% by weight 3,5 Di-tert-butylesalicylic acid, zinc salt in Example 6.

EA particles were prepared by the standard aggregation/coalescence process as previously described above using latex the latex containing 0.8% of BONTRON E-84 as the charge control agent as described above in Example 6. This latex was used for both core and shell. Particles with the final median volume size of 6.03 um with 1.22 volume GSD 84/50 and a 1.21 number GSD 50/16 were produced with the circularity of 0.977. Particles were washed and dried and SCD triboelectric measurement was performed on these particles. A-zone triboelectric was measured at −44.8 uC/g.

Example 9

Preparation of EA particles with low CCA latex, as synthesized in Example 6, used in shell only. EA particles were prepared by the standard aggregation/coalescence process. However, a latex containing no incorporated CCA was first used for making a 5.73 micron core particle prior to adding the shell. The particle was then completed by the addition of the shell latex as synthesized in Example 6, with 0.8% of E-84 CCA described above. Particles with the a final median volume size of 6.24 microns with a 1.22 volume GSD 84/50 and a 1.22 number GSD 50/16 had been produced with the circularity of 0.972. Particles were washed and dried and SCD triboelectric measurement was performed on these particles. A-zone triboelectric was measured at −38.1 uC/g.

The Example thus prepared represents a core/shell particle in which the core and components were prepared from a non CCA containing latex and the shell composed of a latex containing 0.8% by weight 3,5 Di-tert-butylesalicylic acid, zinc salt.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process comprising:
    forming particles in a latex by emulsion polymerization of a mixture comprising:
        one or more monomers in an emulsion; and
        less than about 4 percent by weight of the mixture of a non-surfactant-based charge control agent, wherein the non-surfactant-based charge control agent is distributed within a matrix of the particles; and
    forming toner particles from the particles in the latex, wherein the particles in the latex are used to form a shell of the toner particles and further wherein the toner particles support a sufficient triboelectric charge for use under A-zone environmental conditions in a single-component development system.

2. The process of claim 1, wherein the non-surfactant-based charge control agent is present at a concentration of less than about 3 percent by weight of the mixture.

3. The process of claim 1, wherein the non-surfactant-based charge control agent is present at a concentration of less than about 2 percent by weight of the mixture.

4. The process of claim 1, wherein the non-surfactant-based charge control agent is present at a concentration of less than about 1 percent by weight of the mixture.

5. The process of claim 1, wherein the toner particles support a sufficient charge for use under C-zone environmental conditions in a single-component development system.

6. The process of claim 1, wherein the toner particles are negatively charged.

7. The process of claim 1, wherein the sufficient triboelectric charge for use under A-zone environmental conditions is in a range from about −20 microcoulombs/gram to −100 microcoulombs/gram.

8. The process of claim 1, wherein the non-surfactant-based charge control agent is a metal salicylate.

9. The process of claim 6, wherein the metal salicylate comprises zinc or aluminum.

10. The process of claim 1, wherein the non-surfactant-based charge control agent is hydrophobic.

11. The process of claim 1, comprising forming a core of the toner particles from the particles in the latex.

12. The process of claim 1, comprising forming a core and shell from the particles in the latex.

13. The process of claim 1, wherein the one or more monomers comprises a styrene, an acrylate, a methacrylate, a butadiene, an isoprene, an acrylic acid, a methacrylic acid, an acrylonitrile, and combinations thereof.

14. A process comprising
    polymerizing by emulsion polymerization a mixture comprising:
        one or more monomers in an emulsion;
        about 1 percent or less by weight of the mixture of a negatively charged charge control agent;
        wherein the polymerizing step provides a latex with the non-surfactant-based charge control agent distributed within a matrix of the latex; and
    forming by emulsion aggregation/coalescence a plurality of toner particles, wherein the latex is used to form a shell of the toner particles and further
        wherein the plurality of toner particles support a sufficient triboelectric charge for use under A-zone environmental conditions in a single-component development system.

15. The process of claim 14, wherein the plurality of toner particles support a sufficient charge for use under C-zone environmental conditions in a single-component development system.

16. The process of claim 14, wherein the negatively charged charge control agent is a metal salicylate.

17. The process of claim 12, wherein the sufficient triboelectric charge for use under A-zone environmental conditions is in a range from about −20 microcoulombs/gram to −100 microcoulombs/gram.

* * * * *